United States Patent [19]

Lindbergh

[11] 4,061,387
[45] Dec. 6, 1977

[54] NET-RAISING TOOL

[75] Inventor: Jon M. Lindbergh, Bainbridge Island, Wash.

[73] Assignee: Union Carbide Corporation, New York, N.Y.

[21] Appl. No.: 719,465

[22] Filed: Sept. 1, 1976

[51] Int. Cl.$^2$ .............................................. B65G 7/12
[52] U.S. Cl. ........................................... 294/26; 43/8
[58] Field of Search ............... 294/15, 26, 55.5, 49, 294/61; 24/230.5 R, 230.5 AD, 230.5 LH, 230.5 FH, 230.5 W; 43/4, 4.5, 5, 6.5, 8; 172/378; 224/45 P, 45 Q, 45 T; 254/131, 137, 138

[56] References Cited

U.S. PATENT DOCUMENTS

| 218,865 | 8/1879 | Eagan | 294/26 |
| 1,069,511 | 8/1913 | Zeman | 294/55.5 |
| 1,086,636 | 2/1914 | Anderson | 294/26 |
| 1,303,692 | 5/1919 | Link | 294/26 |
| 1,515,975 | 11/1924 | Smith | 294/26 |
| 1,525,810 | 2/1925 | Hill et al. | 294/26 |
| 1,710,575 | 4/1929 | Grant | 294/26 |
| 2,623,772 | 12/1952 | Johnson | 294/26 |

FOREIGN PATENT DOCUMENTS 1,235,050  5/1960  France ...................... 224/45 T Primary Examiner—Johnny D. Cherry
Attorney, Agent, or Firm—Owen, Wickersham & Erickson

[57] ABSTRACT

A net-raising tool for use in raising fish nets, either empty or laden with fish. A series of dull, net-engaging hooks are located at one end of each of a series of several parallel tines. The tines all lie in substantially a common plane, and the hooks are all in line. The tines are joined together by at least one cross-member. A handle member is provided, preferably spaced from the cross-members, preferably taking the form of a bar parallel to the rearmost cross-member on the opposite side from the tines. The handle bar may be joined to the cross-member by members perpendicular to both of them, so as to provide a hand-receiving and hand-protecting opening in between the handle bar and the rearmost cross-member.

7 Claims, 2 Drawing Figures

U.S. Patent   Dec. 6, 1977   4,061,387
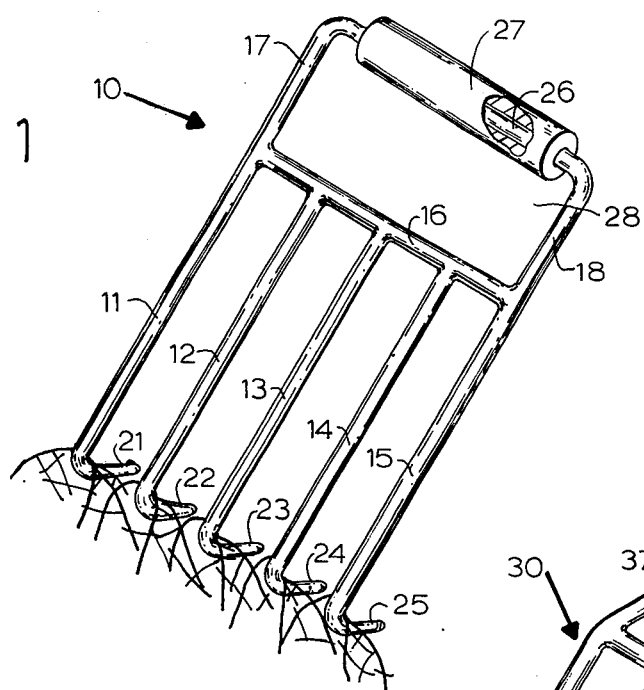
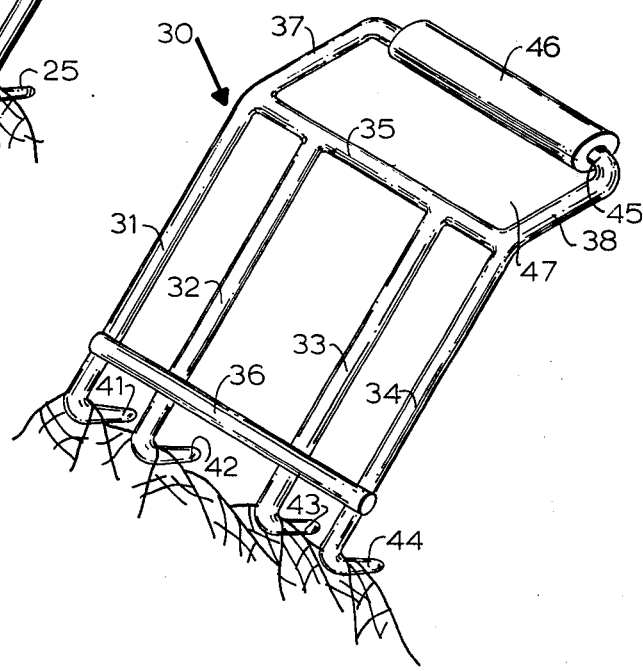

NET-RAISING TOOL

BACKGROUND OF THE INVENTION

This invention relates to a net-raising tool for use in raising fish nets, especially when they are laden with fish.

Fish nets have often been raised simply by hand, but that is both inefficient and hard on the hands, even when gloves are used, because one's hand can only grasp the net by inserting the fingers through the net or by pulling a portion of the net into a bundle. Moreover, there is liable to be slippage if suitable gloves are worn, or even without them; if no gloves are worn, there is considerable wear on the hands. Small mesh nets, such as are used in the fish pens for fish farms, are difficult to pull with one's fingers, and they tend to cause skin abrasion and cuts.

The present invention is intended to enable one to exert a maximum pulling strain on the net without tearing the mesh, and also without cutting or otherwise injuring the hands. It distributes the stress of the weight of the net on several meshes rather than on one or two, so that there is less chance to damage the net.

A significant object of the invention is to provide a net-raising tool which can be used by each man who works with a net, so that he can rapidly engage the net and then work to lift or pull his portion of it without either damaging the net or injuring this hands.

SUMMARY OF THE INVENTION

The invention provides a net-raising tool in which a series of several net-engaging hooks are located in line and generally along a common plane. Operational practice has shown that a multiple-prong hook is necessary in order to avoid damage to the net that is inflicted with a tool having only one or two hooks. Having at least three prongs, i.e., a series of prongs or hooks, distributes the stress of the weight of the net on several meshes and thereby reduces the likelihood of damage to the net. The hooks are joined together by suitable support means, and there is a handle to provide a hand-receiving and hand-protecting opening well spaced from the hooks, and enabling one to grasp the tool and thereby work with the net. It is important for the handle to be extended long enough to avoid injury to the fingers.

Typically the support means may include a series of several metal tines parallel to each other and lying in a common plane. Each tine has a dull hook at its outer end, and the hooks are in line with each other and are substantially co-planar. Back from the hooks a cross-member of the same metal connects all the tines together. A handle is then secured to the cross-member in such a way that a handle bar lies parallel to the cross-member and is spaced back from it on the opposite side from the hooks. Preferably, a pair of end members join the handle bar to the cross-member to provide the hand-receiving and hand-protecting opening in between the cross-member and the handle bar. Preferably, the handle bar itself is either thicker than the usual wire tines or includes a member that provides a larger surface for grasping by the hand. Also, in some instances it is desirable to have a handle connected to the cross member in such a way as to provide that the connection will lie at an angle to the tines.

Other objects and advantages of the invention will appear from the following description of some preferred embodiments.

BRIEF DESCRIPTION OF THE DRAWINGS

In the drawings:

FIG. 1 is a view in perspective of a net-raising tool embodying the principles of the invention.

FIG. 2 is a similar view of a modified form of tool also embodying the principles of the invention.

DESCRIPTION OF THE PREFERRED EMBODIMENTS

FIG. 1 shows a net-raising tool 10 embodying the principles of the invention. The tool 10 incorporates a plurality of tines, five tines 11, 12, 13, 14, and 15 being shown, each preferably made from heavy, stiff, metal wire, and each joined at one end to a cross-member 16. The joining may be by welding the tines 11, 12, 13, 14, and 15 to the cross-member 16. Preferably all the tines 11, 12, 13, 14, and 15 and the member 16 lie in or close to a common plane, and preferably all the tines 11, 12, 13, 14, and 15 are approximately the same length. Each of the tines 11, 12, 13, 14, and 15 has at its outer end a hook portion 21, 22, 23, 24, 25, respectively. This may be made by taking the wire member and curving it around. The points of the hooks 21, 22, 23, 24, and 25 must be sufficiently dull that they are not liable to pierce the twine of the net or tear it. The gauge of the metal used for the tines and hooks is heavy enough to avoid cutting stress on the individual meshes of the nets. A suitable tine diameter is $\frac{1}{4}$ inch.

The two tines 11 and 15 at each end may be longer than the rest, having portions 17 and 18 which extend well beyond the cross-member 16 to a metal member 26, which lies parallel to the cross-member 16 and may be made of the same material. In order to provide a better hand grasp, a handle member 27 may be made from plastic to surround the metal member 26. This handle 27 is preferably fixed in position and does not roll on the metal memeber 26. As a result of this structure, a hand-receiving and hand-protecting opening 28 is provided defined by the handle 27, the cross-member 16, and the two tine portions 17 and 18. This enables the user to insert his hand into the opening 28 and grasp the handle 27 firmly without having to risk damage to his hand, or of the least discomfort, as he would if he had to hold on to the cross-member 16.

FIG. 2 shows a tool that is basically similar to the tool 10, but has some differences. In this case, a net hook 30 is provided in which there are present four tines 31, 32, 33, and 34 with their respective hooks 41, 42, 43, and 44. There is a rear cross-member 35 and a forward reinforcing cross-member 36. Portions 37 and 38 which correspond to the portions 17 and 18 here lie at an angle to their respective tines 31 and 34 and to the plane of the tines 31, 32, 33, 34. The portions 37 and 38 are joined by a metal member 45 around which is a plastic handle 46. The handle 46 extends out on the same side of the tines as the hooks. This construction has several advantages; it enables the hooks 41, 42, 43, 44 to engage a net more easily from a more relaxed drop position of the handle 46, and also the resulting opening 47 affords somewhat better protection to the user's hands.

The use of the tools 10 and 30 is quite simple. The users, who usually operate in teams, although the tool still helps even if one man is working alone, reach down with the tool 10 or 30, holding it by the handle 27 or 46 and with a short motion force the dull hooks 21, 22, 23, 24, 25, or 41, 42, 43, 44 into the meshes of the net. He then pulls up on the handle 27 or 46 to raise it, and the hooks then carry the net up along with them. After getting the net up to a desired height, they may readily disentangle the hooks, reach down lower again, and bring back up more of the net. This tool enables the net, even laden with fish, to be accurately and definitely engaged and to do so even in a net with meshes that would be very inconvenient if one were using his fingers, whether in gloves or not. At the same time, the tool helps to protect one's hands from the kind of damage one tends to get in working with such a net.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A net-raising tool for use in raising a fish net having meshes and laden with fish, comprising
    a series of several dull-ended, constant-diameter net-engaging members about one-quarter inch in diameter located in line along substantially a common plane, for exerting an even strain on the net at a corresponding series of meshes,
    support means joining said net-engaging members together, and
    handle means joined to said support means and spaced from it so as to provide a hand-receiving and hand-protecting opening well spaced from said net-engaging members.

2. A net-raising tool, including in combination
    a series of several tines of substantially constant diameter, lying in a common plane, each being about one-quarter of an inch in diameter having a dull hook at its outer end so that they are not liable to pierce or tear the net twine, the hooks being in line and substantially co-planar with each other for entering a series of meshes for exerting even strain on the net at those meshes,
    a cross-member connecting all said tines together well to the rear of said hooks,
    a handle parallel to said cross member and spaced from it on the side further from said hooks, and
    connection means for joining said handle to said cross-member while providing a hand-receiving and hand-protecting opening between them.

3. The tool of claim 2 wherein there are at least four tines and four hooks.

4. The tool of claim 2 wherein said connection means comprise extended portions of the two tines which are the first and last of said series.

5. The tool of claim 2 having a reinforcing cross-member closely adjacent the hooks.

6. The tool of claim 2 wherein the handle and the tines lie in said common plane.

7. The tool of claim 2 wherein the connection means and handle are in a plane that lies at an angle to said common plane.

* * * * *